CAM-A

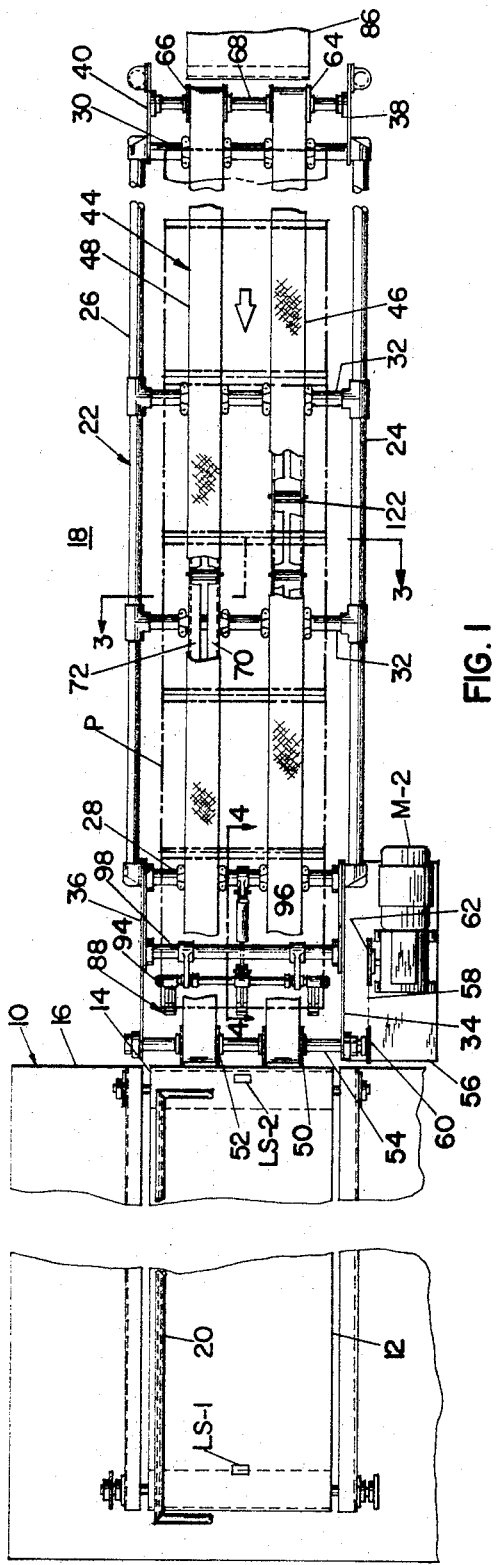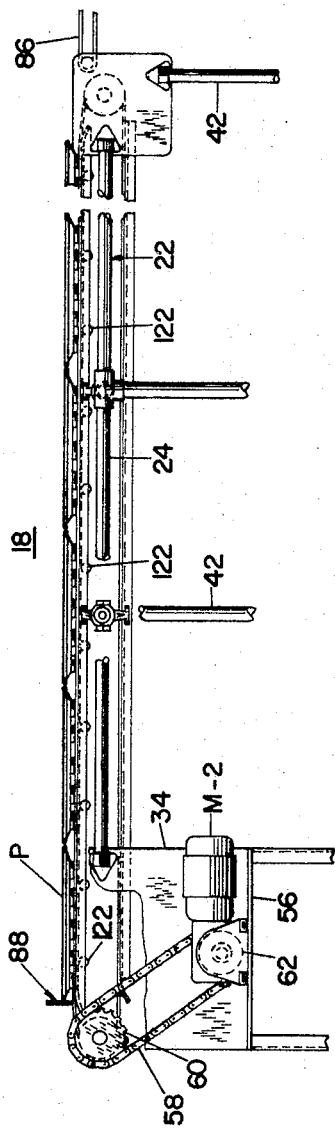
FIG. 1
FIG. 2
INVENTOR.
HOWARD S. HERSHEY JR.
BY
Otto Moeller INVENTOR.
HOWARD S. HERSHEY JR.
BY
Otto Moeller

CAM-B

CAM-C

INVENTOR.
HOWARD S. HERSHEY JR.
BY
Otto Moeller

United States Patent Office 3,428,163
Patented Feb. 18, 1969

3,428,163
VARIABLE TRACTION CONVEYOR
Howard S. Hershey, Jr., Brodbecks, Pa., assignor, by mesne assignments, to Teledyne, Inc., Los Angeles, Calif., a corporation of Delaware
Filed May 24, 1967, Ser. No. 641,025
U.S. Cl. 198—41    6 Claims
Int. Cl. B65g 17/46

ABSTRACT OF THE DISCLOSURE

A non-magnetic endless continuously operating conveyor advances a file of randomly spaced pans and accumulates them in a consolidated file against a stop member, the stop member being periodically moved between pan arresting and pan releasing position in timed relation with operation of a further instrumentality to accumulate and release successive groups of consolidated pans. A plurality of longitudinally spaced, transversely extending electromagnets are disposed beneath the conveyor arranged to be energized upon withdrawal of the stop to create a magnetic field to substantially increase the pressure of the pans against the conveyor above their normal weight to provide rapid acceleration from rest to the speed of the conveyor to insure proper orientation of the groups of pans with such further instrumentality; and arranged to be de-energized upon return of the stop means to pan arresting position to permit the conveyor to freely slide beneath the pans as they are accumulated.

Background of the invention

The invention relates to conveyors and more particularly to a conveyor unit including an endless continuously traveling conveyor and a stop member movable periodically between article arresting and article releasing position for accumulating and releasing successive groups of articles.

Summary of the invention

In many automated systems it is essential that the successively released spaced groups of articles, either in a consolidated file or in a uniformly spaced file as when the groups of articles after being released are transferred onto a more rapidly moving conveyor, arrive at a given location in synchronous timed relation with the operation of the further article handling unit as for example, in presenting successive groups of pans of dough in proper position in front of a proofer and in proper timed relation with an intermittently opening pusher for introduction of such successive groups of pans of dough onto successive shelves or trays of a continuously operating proofer. Because of the slippage of the conveyor beneath the group of articles when they are released by withdrawal of the stop member, acceleration of the articles to the speed of the conveyor is in many cases delayed to an extent impairing the timing of the arrival of the articles at a subsequent operating station. It is therefore an object of the invention to provide an article grouping and releasing unit to effect a more rapid acceleration of the articles such that timing impairment is minimized or rendered negligible.

More specifically an object is to provide in such a unit means for automatically and substantially instantaneously increasing the frictional resistance between the conveyor and the articles at the time of release above the frictional resistance exerted by the normal weight of the articles and moreover for controlling the extent of such frictional resistance. To this end the invention contemplates the use of electromagnetic means acting on the articles and control means therefor for controlling the pressure between the contacting surfaces of the articles and the conveyor.

More rapid acceleration of articles to the speed of the continuously traveling conveyor upon withdrawal of the stop member can be achieved to some extent by provision of a conveyor having a relatively high coefficient of friction. However, in such cases cumulative forward pressure of the articles, for example shallow dough pans used in making frankfurter or hamburger buns, as they collect in a consolidated row against the stop member prior to being released in groups of selected numbers, frequently causes the pans to shingle or climb up one over the other to thereby disrupt the operation of the conveying system. The use of a conveyor of this type furthermore causes excessive wear on the articles or the conveyor or both as the conveyor slides beneath the articles during accumulation of the articles against the stop member, and also causes an objectionably high impact against the stop member when conveying fragile articles or pans of proofed dough. It is, therefore, an object to provide an article accumulating and releasing unit that permits of the use of a conveyor having a relatively low coefficient of friction to minimize or render negligible these objectionable characteristics while at the same time minimizing or rendering negligible slippage of the articles upon release as a group incident to employment of a conveyor having a relatively low coefficient of friction and attendant impairment of synchronization.

Automated systems of the above described type are frequently required to handle runs of a product of one weight followed by one or more runs of other weights, and since friction is proportional to the pressure between the surfaces in contact, slippage or different weight runs of articles released as groups upon periodic withdrawal of the stop member will vary so that runs of groups of articles of one weight will not reach a given location in the same time as runs of groups of articles of a different weight and will be out of synchronization with a further article handling unit. It is, therefore, another object to provide an article accumulating and releasing unit that effectively causes groups of articles of a run of one weight articles accumulated behind a stop member on a continuously traveling conveyor to respond to withdrawal of the stop member in the same manner as groups of articles of a succeeding run or runs of other weight articles.

Other objects and advantages of the invention will be hereinafter pointed out or will become apparent from the following description taken in conjunction with the accompanying drawings.

Briefs description of the drawings

FIGURE 1 is a plan view, with parts broken away, showing a preferred embodiment of the conveying, accumulating and releasing system in which pans of dough are supplied to a proofer;

FIGURE 2 is a view in side elevation of the conveying, accumulating and releasing system of FIGURE 1;

Description of the preferred embodiment

Figure 3:
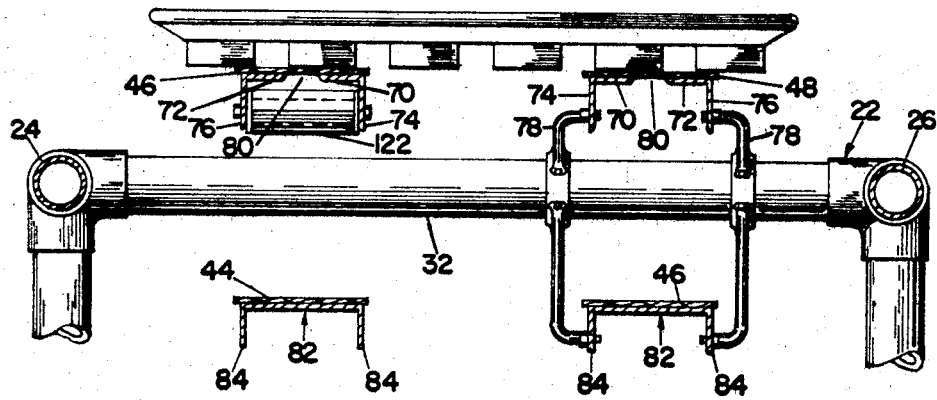
FIGURE 3 is a sectional view taken on line 3—3 of FIGURE 1.

Referring to FIGURE 1 of the drawings, the invention is illustrated therein as embodied in a conveyor system for delivering bun pans in which dough pieces have been deposited, to the inlet end of a dough proofer 10, from whence they are pushed in successive transverse rows onto successive shelves or trays (not shown) of the proofer for conducting the pans through the proofer. Such proofers are well known in the baking industry and only those elements necessary to an understanding of the invention are shown in the drawings.

The proofer includes an intermittently operating endless conveyor 12 horizontally disposed in the forward end portion of the proofer housing and extending transversely theerof. The infeed end of conveyor 12 projects for a short distance through an opening 14 in the side wall 16 of the proofer housing to which the pans P are delivered from the pan accumulating, grouping and releasing unit, designated as a whole by the reference numeral 18. A pusher 20 is operated cyclically in any well known manner, as shown for example in Howard application Ser. No. 365,580, filed May 7, 1964, in timed relation with the arrival of successive trays or shelves of the proofer at the loading station to push successive rows of pans from the infeed conveyor 12 onto successive trays or shelves of the proofer.

Figure 6:
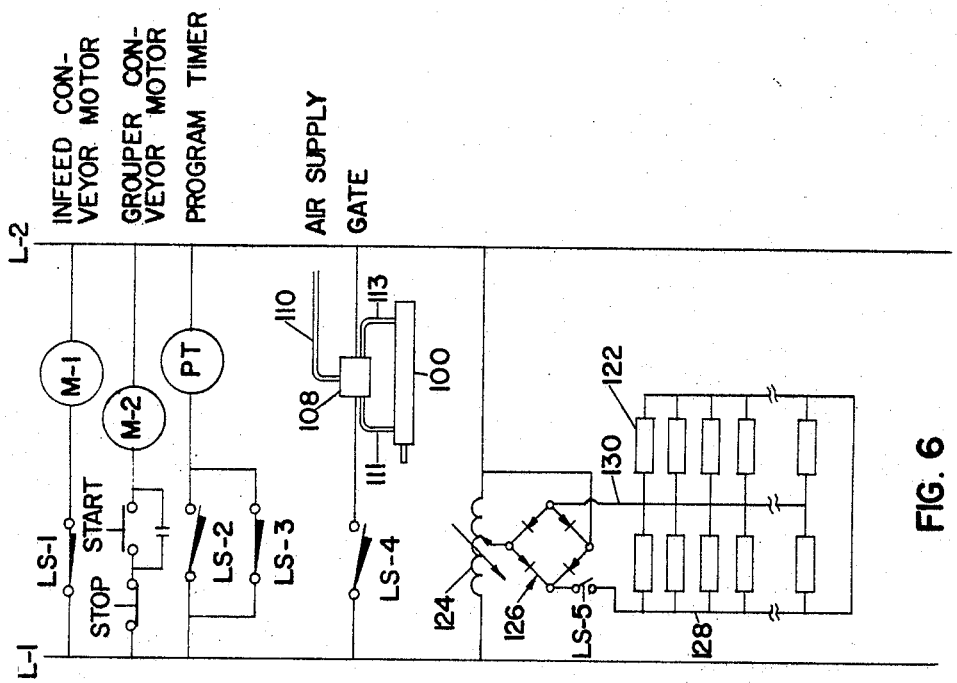
FIGURE 6 is an electrical diagram showing the operation of the conveying system.

A motor of conventional type for driving the proofer infeed conveyor 12 is designated in the electrical control diagram, FIGURE 6, by the reference character M–1. The means for controlling operation of the motor M–1 includes a normally closed limit switch LS–1 disposed adjacent the forward end of the proofer infeed conveyor 12 in position to be engaged and opened by the leading pan of a group of pans thereby breaking the circuit to motor M–1 to stop the infeed conveyor 12 with the group of pans in position to be pushed therefrom by the cyclically operating pusher 20. The pusher 20 is provided with a contact arm (not shown) adapted to engage and retain the limit switch LS–1 open when the pans have been pushed out of engagement therewith, and to disengage the limit switch LS–1 as it approaches the end of its rectracting stroke, to permit re-closing of limit switch LS–1 and thereby restart motor M–1 to operate the infeed conveyor 12 for introduction of another row of pans.

The pan accumulating, grouping and releasing unit 18 includes a rectangular support frame 22, preferably formed of suitable pipe sections and pipe fittings, including a pair of laterally spaced parallel side rails 24 and 26 connected by transversely extending forward and rearward end rails 28 and 30, and a plurality of equidistantly spaced intermediate cross rails 32. Suitably connected between the opposite ends of the forward end rail 28 and the forward ends of the side rails 24 and 26 are a pair of plates 34 and 36 disposed in parallel longitudinally extending vertical planes. Also, suitably connected between the opposite ends of the rearward end rail 30 and the rearward ends of the side rails 24 and 26 are a pair of plates 38 and 40 disposed in parallel longitudinally extending vertical planes. Legs 42 support the frame 22 a desired distance above the floor.

The conveyor 44 of the pan accumulating, grouping and releasing unit 18 includes a pair of parallel laterally spaced longitudinally extending belts 46 and 48 formed of a non-magnetic material, disposed between the side rails 24 and 26 with the upper runs thereof being disposed in a plane above end and intermediate cross rails 28, 30 and 32 and the lower runs being disposed in a plane spaced therebelow. The endlless belts 46 and 48 are trained at their forward ends over drive pulleys 50 and 52 keyed, or otherwise suitably fixed, on a transversely extending shaft 54 journaled in suitable bearings carried by the plates 34 and 36.

The shaft 54 is continuously driven by a reduction gear head motor M–2, mounted on a bracket 56 carried by the plate 34, through a sprocket chain 58 trained around around sprockets 60 and 62 mounted, respectively, on a projection of shaft 54 and an output shaft of the reduction gear head motor M–2. A conventional stop-start switch, as shown in FIGURE 6, may be employed for starting and stopping the motor M–2. At their rearward ends, endless belts 46 and 48 are trained around pulleys 64 and 66 keyed, or otherwise suitably fixed, on a shaft 68 journaled in suitable bearings carried by the plates 38 and 40.

Referring particularly to belt 48, it being understood that this applies as well to belt 46, a pair of parallel longitudinally elongated planar support plates 70 and 72 formed of a magnetic material are provided for the upper load supporting run of the belt 48 to prevent sagging thereof, and extend from points adjacent front pulley 52 to points adjacent rear pulley 66. The laterally remote longitudinally extending side edges of the support plates 70 and 72 are provided with downwardly projecting flanges 74 and 76, as best shown in FIGURES 3, bolted or otherwise secured in suitable manner to the upper ends of brackets 78 carried by the cross rails 32 to thereby support the plates 70 and 72 at an elevation above the end and cross rails 28, 30 and 32 of the frame 22. For reasons to be explained, the support plates 70 and 72 are spaced laterally from each other to provide therebetween a gap 80 beneath the belt 48, and the plates 70 and 72 together with their flanges 74 and 76 are made of a magnetic material. The lower run of the belt 48 is supported against sagging on the top face of an inverted longitudinally elongated channel member 82 bolted or otherwise suitably secured through its depending flanges 84 to the lower ends of the brackets 78 carried by the cross rails 32.

Figure 4:
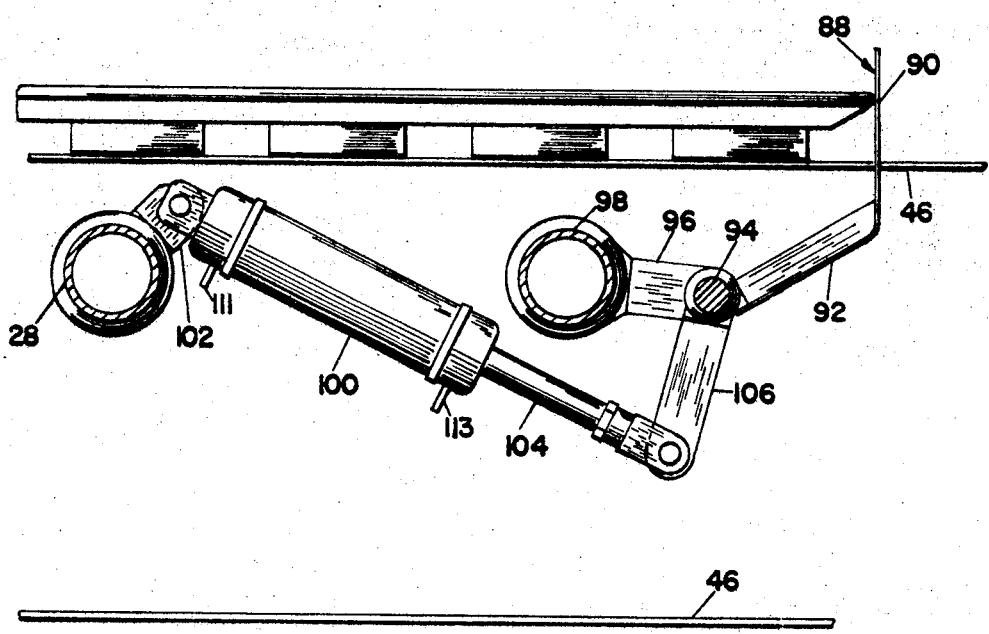
FIGURE 4 is a sectional view taken on line 4—4 of FIGURE 1.

Pans of dough coming from a make-up station, not shown, are conveyed Indian file in haphazard spaced relation along any suitable type of conveyor 86 to the belts 46 and 48 of the accumulating, grouping and releasing unit 18, where they are accumulated in a consolidated row against an intermittently operated stop means, preferably a gate 88, movable between an extended position in the path of the pans blocking further advance thereof by the continuously operating belts 46 and 48, and a retracted position out of the path of the pans to permit advance of a group of pans onto the proofer infeed conveyor 12. The gate 88, which is preferably, though not necessarily, disposed as near as practicable to the discharge end of the belts 46 and 48, includes fingers 90 disposed between the belts 46 and 48 and between the belts 46 and 48 and the side plates 34 and 36 at the forward end of the support frame 22. The fingers 90 project upwardly from a point below to a point above the plane of the belts 46 and 48 in the extended or pan blocking position of the gate 88. Referring particularly to FIGURES 1 and 4, the lower ends of the fingers 90 are provided with rearwardly extending lever arms 92 rigidly secured to a transversely extending rock shaft 94 rotatably mounted in brackets 96 rigidly secured to and extending forward from a cross rail 98 secured at its ends to the plates 34 and 36 of the frame 22.

The operating means for oscillating the rock shaft 94 to thereby raise and lower the gate fingers 90 between pan intercepting and pan releasing position includes an air cylinder 100 that is pivotally connected to a bracket 102 rigidly secured to the forward end rail 28 of the support frame 22. The free end of the piston rod 104 of the air cylinder 100 is pivotally connected to one end of a crank 106, the other end of the crank 106 being rigidly secured to the rock shaft 94. A solenoid operated valve 108, FIGURE 6, controls admission of air from an air supply line 110 to one end or the other of the air cylinder 100 through lines 111 and 113 for raising or lowering the gate 88.

Figure 5A:
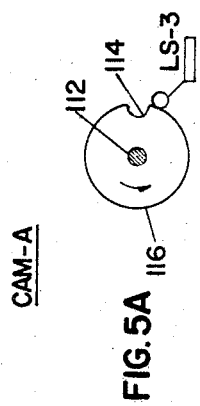
FIGURES 5A, 5B and 5C are diagrammatic views showing the relative positions of the cams of the program timer cam bank.
Figure 5B:
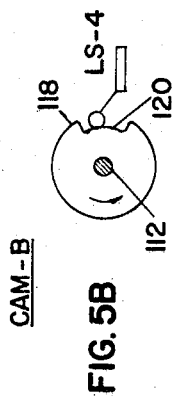
Figure 5C:
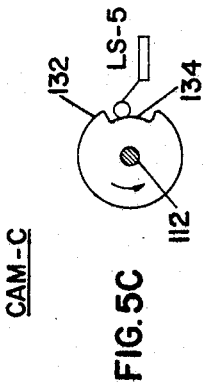

In order that successive accumulated groups of articles, in the present instance pans of dough, are released by the gate 88 for advancement to a given position in timed relation with operation of a further instrumentality, in the present instance for presentation of the successive groups of pans by the intermittently operated proofer infeed conveyor 12 in proper position to be pushed by the cyclically operated pusher 20 onto successive shelves or trays of the proofer, control means now to be described is provided. A second normally open limit switch LS–2 is disposed to be momentarily closed by a projection on the pusher 20 as the latter approaches its retracted or home position. Momentary closing of limit switch LS–2 completes a circuit to a program timer PT, FIGURE 6, of suitable type well known in the art. Initiation of operation of the program timer PT rotates program timer shaft 112, FIGURES 5A, 5B and 5C in the direction of the arrow, causing normally open limit switch LS–3 to ride out of a notch 114 onto the high portion 116 of a cam A fixed on the program timer shaft 112, thereby closing limit switch LS–3 to maintain the program timer in operation when momentarily closed limit switch LS–2 re-opens.

Operation of the program timer PT is such that cam A makes one revolution in a somewhat greater time than is required for the last pan of the group to pass the gate 88 when the gate is withdrawn, so that upon completion of one revolution of the cam A, the limit switch LS–3 will re-enter the notch 114 of cam A to break the circuit to the program timer PT.

On the program timer shaft 112 is a second cam, cam B, controlling the operation of the gate 88. Shortly after initiation of operation of the program timer PT, a normally open limit switch LS-4 is arranged to be engaged by the high portion 118 of cam B to close a circuit to solenoid valve 108 to effect admission of air from air supply line 110 through line 113 to the right hand end of air cylinder 100 to withdraw the gate 88, whereupon the group of pans is conveyed by belts 46 and 48 onto the proofer infeed conveyor 12 for introduction into the proofer. The extent of the high portion 118 of cam B is such that when the limit switch LS–4 rides off high portion 118 into the depressed portion 120, the last of the pans of the group will have just passed the gate 88. The circuit to the solenoid valve 108 is thereupon broken to effect admission of air from supply line 110 through line 111 to the left hand end of air cylinder 100 to raise the gate 88 in position to accumulate thereagainst a succeeding group of pans. Shortly after entry of the limit switch LS–4 in the depression 120 of cam B to effect raising of the gate 88, the limit switch LS–3 enters the notch 114 of cam A to thereby break the circuit to the program timer PT to halt further rotation of program timer shaft 112 and its cams A and B. Now, upon the next cylical operation of the proofer loading pusher 20, the above sequence of operations is repeated.

Because of slippage of the belts 46 and 48 beneath the pans when the gate is lowered with consequent delay in acceleration of the pans to the speed of the belts, the timing of the arrival of the group of pans with the cyclical operation of the proofer pusher 20 in proper position to be pushed from the infeed conveyor 12 onto the tray or shelf of the proofer is disordered. Also, the cumulative pressure of one pan against a preceding pan accumulated against the gate 88 due to the friction between the continuously moving belts 46 and 48 and the pans is progressively less between each pan and its next succeeding pan, so that slippage is progressively greater between one pan and the next when the gate is withdrawn with the result that they will not remain in a consolidated group when transferred from the belts 46 and 48 to the infeed conveyor 12 if the belts and conveyor are operating at the same speed, or in uniform spaced relation if the infeed conveyor 12 is operating at a faster speed than the belts 46 and 48.

In the handling of shallow articles, such as bun pans, the cumulative pressure of the pans against each other accumulated against the gate 88, frequently causes shingling or riding of one pan over a preceding pan resulting in jambing of the conveying system and destroying proper orientation of the pans relative to the proofer pusher. In order to avert such shingling, or in the handling of fragile articles which due to such cumulative pressure may cause deforming thereof, it is desirable to employ belts 46 and 48 having as low a coefficient of friction as possible, so that as the pans or articles are accumulating against the gate 88, the belts slide freely thereneath to minimize the excessive build up of pressure on the leading pans or articles. However, employment of such low coefficient friction belts 46 and 48 aggravates the slippage of the belts beneath the pans or articles when the gate is withdrawn causing increased disorientation of the pans or articles with respect to a further instrumentality, as a proofer pusher in the embodiment shown in the drawings.

In order to minimize or render negligible such problems of orientation and shingling or damage to articles incident to accumulation of successive articles on the continuously moving belts 46 and 48 behind the gate 88 and release thereof upon withdrawal of the gate, a plurality of longitudinally spaced transversely extending electromagnets 122 are disposed beneath each of the belts 46 and 48. In FIGURE 2 the electromagnets 122 are shown spaced apart a longitudinal distance such that beneath each belt 46 and 48 there are two electromagnets for each pan of the longest group of accumulated pans that are to be handled. The pans in this particular instance represent the longest pans that are to be handled, so that if a run of shorter articles or pans are to be handled, there would still be at least one electromagnet beneath each of the belts 46 and 48 for each of such shorter articles or pans.

The ends of the electromagnets 122 beneath the belt 46, as best shown in FIGURE 3, are secured at their ends to the flanges 74 and 76 of the belt supporting plates 70 and 72 forming poles for the electromagnets 122 separated by the air gap 80 to thereby provide a concentrated magnetic field directly under the pans. It will be understood that a similar arrangement is provided for the electromagnets 122 beneath the belt 48.

The electromagnets 122 are oriented in such manner that all poles of one polarity are connected with the pole piece 70 beneath belt 46, and all poles of opposite polarity are connected with the pole piece 72 beneath belt 46. The electromagnets 122 beneath the belt 48, it is understood, are similarly oriented. The electromagnets are also preferably oriented in such manner that the adjacent pole pieces 70 of the two rows of pole pieces have the same polarity to prevent short circuiting of the magnetic lines of force and weakening of the magnetic field strength across the gaps 80.

The control means for energizing and de-energizing the electromagnets 122 includes a variable auto-transformer 124 connected between the lines L–1 and L–2 in order to selectively adjust the current through the coils of the electromagnets 122 for increasing or decreasing the magnetic field strength across the gap 80 and thereby increasing or decreasing the frictional resistance between the pans and the belts a desired amount above the frictional resistance exerted by the normal weight of the pans. Referring to FIGURE 6, the variable auto-transformer 124 is connected to the AC terminals of a suitable commercially available rectifier 126. The positive line 128 connects a DC terminal of the rectifier 126 with the remote ends of the coils of the electromagnets 122 under each of the belts 46 and 48 and the negative line 130 connects the other DC terminal of the rectifier 126 with the adjacent ends of the coils of the electromagnets 122 under each of the belts 46 and 48.

The means for controlling energization and de-energization of the electromagnets 122 includes a normally open limit switch LS–5 in the positive line 128 responsive to a third cam, cam C, mounted on program timer shaft 112 for rotation therewith. The cam C is in all respects the same as cam B and is disposed on shaft 112 in the same phase relation with cam B. Substantially simultaneously with the withdrawal of the gate 88 when limit switch LS–4 is engaged by the high portion of cam B, as previously described, the limit switch LS–5 is engaged by the similar high portion 132 of cam C, thereby retaining limit switch LS–5 closed to complete the circuit to and energizing the electromagnets 122. The substantially increased pressure of the pans against the belts 46 and 48 above the pressure of their normal weight accelerates the movement of the pans to the speed of the belts 46 and 48 with a minimum of relative slippage. Substantially simultaneously with the raising of the gate 88 when limit switch LS–4 rides off high portion 118 of cam B into the depressed portion 120 upon passage of the last pan of the group, as previously described, limit switch LS–5 rides off similar high portion 132 of cam C into the depressed portion 134, whereupon switch LS–5 opens to break the circuit to and de-energizes the electromagnets 122. Now as the next group of pans accumulates against the gate 88, the belts 46 and 48 will slide freely beneath the pans.

In a pan conveying system as described above, runs of groups of pans of one weight are generally followed by runs of groups of pans of a different weight. By adjusting the variable auto-transformer 124 for the different runs of pans the magnetic field strength of the electromagnets 122 may be readily changed so that the pans of all runs will respond in the same manner.

In such cases where the articles are of such shape or successive groups are delivered in such manner as to interfere with raising of the gate 88 between the last article of one group and the first article of a succeeding group, any suitable means may be provided for forming a gap therebetween, as for example clamping means such as shown in H. C. Keller et al. Patent No. 1,872,000, timed relative to the gate 88 to clamp against the first article of a succeeding group and to release after a gap has been formed. Such clamping means may be operated by an air cylinder similar to that shown for operating the gate 88, and may be timed to clamp and release by a cam mounted on the program timer shaft 112.

I claim:

1. Magnetically attractable article accumulating and releasing apparatus comprising:
   an endless conveyor of non-magnetic material having an upper run adapted to advance said articles by frictional engagement therewith;
   means for continuously driving said conveyor;
   stop means adjacent the delivery end of said conveyor movable into and out of the path of articles advanced by said conveyor;
   means periodically moving said stop means into said path to accumulate a group of articles against said stop means and out of said path to release said accumulated group of articles;
   a plurality of longitudinally spaced transversely extending electromagnets disposed beneath the upper run of said conveyor providing when energized a magnetic field between the poles thereof in the path of said articles; and
   control means for energizing said electromagnets when said stop means is moved out of the path of said articles for substantially increasing the pressure of said articles against said conveyor above their normal weight to rapidly accelerate the movement of said accumulated group of articles from rest to the speed of said conveyor, and to de-energize said electromagnets when said stop means is moved into the path of said articles to permit said conveyor to slide freely beneath said articles as they accumulate against said stop means.

2. An apparatus as claimed in claim 1 in which said electromagnets are oriented with like ends of said row of longitudinally spaced electromagnets having the same polarity.

3. An apparatus as claimed in claim 1 including means in circuit with said electromagnets for selectively varying the field strength thereof.

4. Magnetically attractable article accumulating and releasing apparatus comprising:
   a support frame;
   a longitudinally extending endless belt conveyor formed of a nonmagnetic material mounted on said support frame for conveying said articles on the upper run thereof by frictional contact therewith;
   means for continuously driving said conveyor;
   stop means adjacent the delivery end of said conveyor movable into and out of the path of articles advanced by said conveyor;
   means periodically moving said stop means into said path to accumulate a group of articles against said stop means, and out of said path to release said accumulated group of articles;
   magnetic belt supports disposed along the length of said belt conveyor in underlying engagement with the upper run thereof and in transverse spaced relation to provide a gap therebetween;
   a plurality of longitudinally spaced transversely extending electromagnets disposed beneath said supports and extending across said gap;
   said laterally spaced apart supports being respectively connected with a respective end of each of said electromagnets to form pole pieces therefor; and
   control means for energizing said electromagnets when said stop means is moved out of the path of said articles for substantially increasing the pressure of said articles against said conveyor above their normal weight to rapidly accelerate the movement of said articles from rest to the speed of said conveyor, and to de-energize said electromagnets when said stop means is moved into the path of said articles to permit said conveyor to slide freely beneath said articles as they accumulate against said stop means.

5. Magnetically attractable article accumulating and releasing apparatus comprising:
   a conveyor including a pair of longitudinally extending laterally spaced endless belts of non-magnetic material having an upper run adapted to advance said pans by frictional engagement therewith;
   means for continuously driving said conveyor;
   stop means adjacent the delivery end of said conveyor movable into and out of the path of pans advanced by said belts;
   means periodically moving said stop means into said path to accumulate a group of pans against said stop means, and out of said path to release said accumulated group of pans;
   a pair of longitudinally extending magnetic supports in underlying engagement with the upper run of each of said belts to provide a gap between each pair of said supports;
   a row of a plurality of longitudinally spaced transversely extending electromagnets disposed beneath each pair of belt supports extending across the gap therebetween;
   each of said supports being respectively connected to the respective ends of the electromagnets disposed therebelow to form pole pieces therefor; and
   control means for energizing said electromagnets when said stop means is moved out of the path of said pans for substantially increasing the pressure of said pans against said conveyor above their normal weight to rapidly accelerate the movement of said pans from rest to the speed of said conveyor, and to de-energize said electromagnets when said stop means is moved into the path of said pans to permit said conveyor to slide freely beneath said pans as they accumulate against said stop means.

6. An apparatus as claimed in claim 5 in which said electromagnets are oriented in such manner that the pole piece forming supports connected to the adjacent ends of the two rows of electromagnets are of the same polarity.

References Cited

UNITED STATES PATENTS

| | | | |
|---|---|---|---|
| 1,809,076 | 6/1931 | Shinn | 271—74 |
| 2,840,223 | 6/1958 | Schoppee | 198—34 |
| 2,996,040 | 8/1961 | Bofinger | 198—41 |

RICHARD E. AEGERTER, *Primary Examiner.*